United States Patent [19]
Burley

[11] 4,281,802
[45] Aug. 4, 1981

[54] THERMAL ICE CAP

[75] Inventor: William G. Burley, Johnstown, Pa.

[73] Assignee: T.I.C. Enterprises, Limited, Johnstown, Pa.

[21] Appl. No.: 140,500

[22] Filed: Apr. 15, 1980

[51] Int. Cl.³ .................. B65H 75/02; B65H 17/48
[52] U.S. Cl. .................................. 242/55; 242/86.52
[58] Field of Search .............. 242/55, 86.52; 62/235

[56] References Cited
U.S. PATENT DOCUMENTS

| | | | |
|---|---|---|---|
| 3,108,804 | 10/1963 | Wagner | 242/86.52 X |
| 3,782,663 | 1/1974 | Stevenson | 242/55 |
| 4,050,972 | 9/1977 | Cardinal | 242/55 |
| 4,084,763 | 4/1978 | Zamboni | 242/86.52 |

Primary Examiner—Edward J. McCarthy
Attorney, Agent, or Firm—Fidelman, Wolffe & Waldron

[57] ABSTRACT

A membranous thermal barrier and means for its placement on and removal from an ice surface, such as a rink, are provided. The barrier comprises a flexible, sheet-like covering having low moisture permeability and thermal insulation properties sufficient to substantially reduce heat transfer to the ice surface when emplaced on the ice during non-use hours. Reel means are provided to wind, transport, store and dispense the covering quickly and with minimal labor.

28 Claims, 7 Drawing Figures

THERMAL ICE CAP

BACKGROUND OF THE INVENTION

Creation and maintenance of an ice sheet or slab for a regulation size ice skating rink having an ice surface measuring 200 feet × 85 feet typically requires a refrigeration plant of about 300 horsepower. This refrigeration plant is usually electrically powered. Depending upon the arena construction and upon the local climate, electricity use will typically range from about 50,000 to 150,000 KWH per month during a winter skating season. Because of the escalating costs of electricity, rink closures are becoming commonplace and the development of new rinks has been greatly inhibited.

The heat load on an ice sheet, which must be removed by refrigeration, is derived from three main sources. Heat is conducted to the ice sheet from beneath and to the sides of the sheet. This heat source is usually small, seldom as much as 10% of the total heat load. Another source of the heat load to the ice sheet is convection including condensation. This heat load is transmitted to the ice sheet by circulation of air above the ice by movement of skaters, thermal differentials and the like. As the air is cooled by contact with the ice, water vapor in the air condenses and freezes, thus adding both the water heat of vaporization and fusion to the ice. The magnitude of this heat load will vary depending upon the conditions maintained within the arena but can often exceed 50% of the total heat load. A third heat source is radiation which is derived both from high temperature sources such as lights and from low temperature sources such as the arena walls and roof. This heat source is also of major proportion and can range as high as 50% or more of the total heat load.

Little can be done in the typical ice rink to reduce these heat losses while the rink is in use. However, studies of rink operations have shown that actual rink usage typically ranges from about 35% to about 50% of total available hours. For example, one arena considered to have heavy usage maintains hours of 3:00 P.M. to midnight on weekdays and from 7:00 A.M. to midnight on weekends. In this example, the ice is in use for 79 of the 168 available hours, or 47% of the time.

It would seem obvious to emplace an insulating cover over the ice sheet during non-operating hours in order to substantially eliminate convection and condensation heat load and to drastically reduce the radiation heat load. Such approaches have always been dismissed as being utterly impracticable to implement on a daily operating basis because of the time, labor and equipment required to place and remove a covering over the nearly ½ acre expanse of the regulation size rink. Compounding the problem is the fact that a typical rink maintains only a skeleton crew on duty during those non-use hours when installation and removal of a covering would be feasible.

It is common to cover athletic fields such as football fields and the like to keep them dry in preparation for a game. However, in those instances large crews are available, insulating value of the tarpaulin or like covering is of little consequence or concern and the installation-removal procedure is done infrequently rather than on a daily basis. Nevertheless, a number of specialized devices have been developed to cover athletic fields. Examples include U.S. Pat. No. 3,108,804 which describes a pair of laterally spaced mobile units having a tubular reel member supported between them. A tarpaulin is rolled upon the reel is stored position and the tarpaulin is unrolled over the surface of a playing field as the mobile units are advanced. U.S. Pat. No. 3,395,918 describes a tarpaulin cover for an athletic field which is wound upon a reel which is mounted on an end-pivoted carrier. It is also known to lay down large expanses of plastic film on ground surfaces as an agricultural mulch and like purposes. One example of a device for covering large fields with a unitary film is described in U.S. Pat. No. 4,050,972.

SUMMARY OF THE INVENTION

A membranous thermal barrier is emplaced and removed from the ice surface of a rink or the like by use of a transportable reel to which the surface of a central portion of the thermal barrier is attached so as to wind a double thickness of the membrane upon the reel starting at the center and proceeding to the membrane ends. In a preferred embodiment, the membrane is sized so as to cover the full length of the ice surface and half of its width. The membrane is first folded in half lengthwise in this embodiment before attachment to the reel so as to allow four membrane thicknesses to be simultaneously wound upon the reel.

Hence, it is an object of this invention to reduce heat transfer to an ice surface when not in use.

It is another object of this invention to provide means to reduce refrigeration costs in the operation of an ice rink.

Yet another object of this invention is to provide a membranous cover adapted for use in covering an ice surface to provide a thermal and vapor barrier therefor.

Another object of this invention is to provide means for applying a thermal barrier to an ice surface and removing the barrier therefrom.

DETAILED DESCRIPTION OF THE INVENTION

The surface of an ice sheet, such as a skating rink or the like, is insulated while not in use by emplacing a thermal barrier thereon. The thermal barrier comprises a membrane or sheet of flexible material which has a very low water vapor transmission rate and has thermal insulating properties. Placement of the membranous thermal barrier upon the ice surface and its removal therefrom is accomplished quickly and with minimal labor by use of a reel having means to attach a central portion of the membrane thereto. Rotation of the reel then winds a double thickness of membrane upon the reel, starting at the center and proceeding to the membrane ends. In a preferred embodiment, the membrane is folded in half, or in thirds, lengthwise before being attached to and wound upon the reel.

Figure 1:
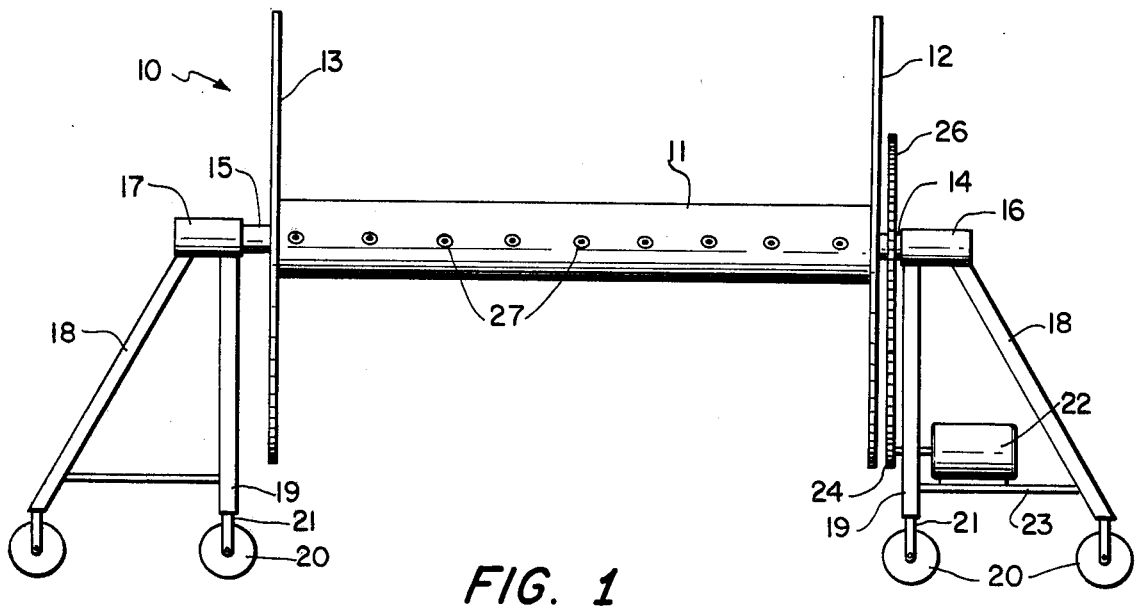
FIG. 1 is a side view of a powered reel for storing, unwinding and taking up the ice cover.
Figure 2:
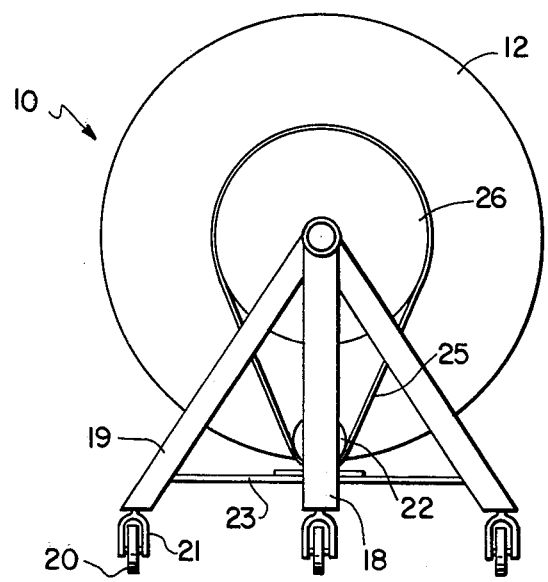
FIG. 2 is an end view of the reel of FIG. 1.

Referring now to FIGS. 1 and 2, there is shown a side and an end view of a reel for use in this invention. The reel, shown generally at 10, comprises an elongated spool member 11 disposed axially between a pair of reel end plates 12 and 13. Axle means 14 and 15 extend outwardly from the reel ends and are journaled in bearings 16 and 17. The reel is supported in a horizontal, rotatable position by a plurality of leg members 18 and 19 extending downwardly from the bearing housing or other suitable support point. A caster or wheel 20, which may be mounted in a swivel frame 21, is mounted at the lower end of each leg member to allow easy movement of the reel onto and across the ice surface. Brake means are preferably associated with one or more of the wheels so as to allow locking the reel in a stationary position.

Reel driving means 22, suitably an electric motor, may be mounted on bracket 23 extending between the leg members. Motor 22 is reversible and so serves to drive the reel in either an unwinding or taking-up mode. Mounted on the shaft of motor 22 is a sprocket or pulley 24 which drives a chain or belt 25 engaging reel sprocket or pulley 26 mounted on axle 14. Motor speed and sprocket size is selected such as to give a suitable reel speed, typically about 10 to 20 rpm.

Figure 3:
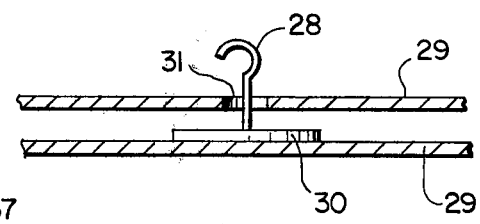
FIG. 3 is a partial sectional, detail view of a portion of the ice cover illustrating a means of attachment to the real.

Disposed axially on the outer surface of spool member 11 are a plurality of attachment means 27 which detachably engage mating attachment means mounted on a surface of the membrane as is shown in greater detail in FIG. 3. Referring now to that Figure, the mating attachment means may comprise a hook member 28 engaging in a corresponding eye of means 27. Other types of paired male-female attachment means may be used as well. As shown in FIG. 3, hook 28 may be secured to membrane 29 through reinforcing base 30 by a suitable adhesive, fusion bonding or similar techniques.

FIG. 3 depicts a preferred embodiment in which membrane 29 is folded lengthwise before attachment to the reel. In this embodiment, slits or holes 31 are provided across one-half of the membrane width corresponding with hook members 28 disposed across the other half of the membrane width. As the membrane is folded lengthwise to form a double thickness, hook members 28 project through slits 31 for attachment to the reel. The hook members and slits are disposed across the membrane in a line perpendicular to its length and essentially midway between the membrane ends.

As may be appreciated, a double fold to obtain a triple thickness of membrane may be accomplished in the same manner. In this case, both sides of the membrane would be folded over the center third of the membrane in which case hook members 28 would be disposed across the center third of the membrane width. Slits or holes 31 would then be provided across the outer two thirds of the membrane width spaced so as to correspond with the hook members.

Figure 4:
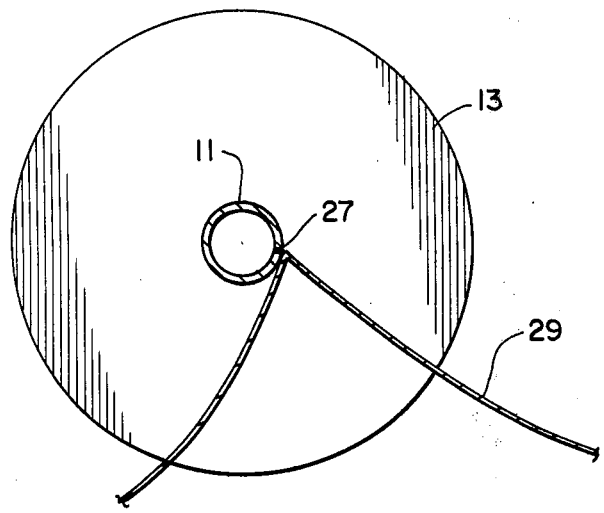
FIG. 4 is a view of a partial reel section illustrating the manner in which the ice cover is taken up on the reel.
Figure 5:
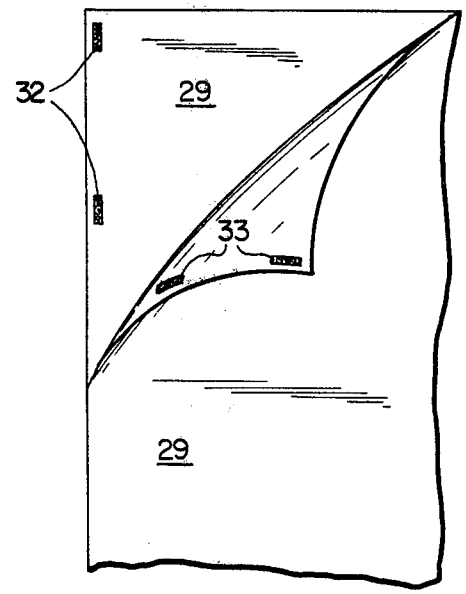
FIG. 5 is a view of a corner portion of the ice cover showing cover alignment means.

After folding the membrane lengthwise and insuring that hook members 28 project through slits 31, the hook members are attached to the reel by way of eye means 27. The resulting membrane-reel configuration is shown in FIG. 4. Thereafter motor 22 is activated which causes a double layer of folded membrane material, either four layers or six layers of membrane in all, to be wound upon the reel. As the folded membrane is wound upon or unwound from the reel, the fold layers have a tendency to slip or move relative to each other. Such movement may be prevented by providing along the membrane edges spaced and paired attachment means 32 and 33 as is shown in FIG. 5. Paired attachment means 32 and 33 may comprise strips of Velcro fastener.

Figure 6:
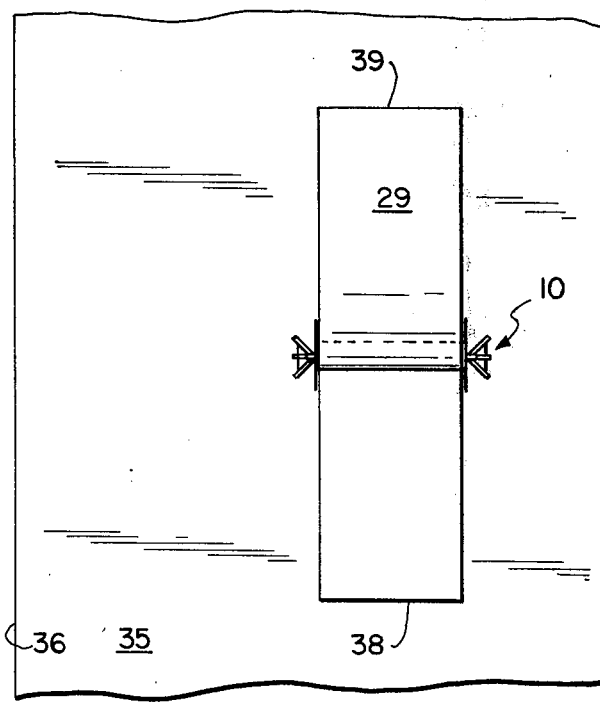
FIG. 6 is a stylized view of the reel in use on a rink surface with the ice cover partially unwound.

Turning now to FIG. 6, there is shown reel 10 positioned on an ice surface 35 having sides or borders 36 and 37. Membrane 29 is shown partially unrolled from reel 10. It is preferred that reel 10 be so-sized that the distance between rink sides 36 and 37 is substantially an even multiple of the length of spool member 11; preferably some four times the length of spool member 11 when the membrane is folded in half as is illustrated in FIG. 6. For example, the regulation American ice rink has a width of 85 feet and a length of 200 feet. In this case, the spool portion of reel 10 would preferably be approximately 21.5 feet in length. As has been described previously, it is preferred that membrane 29 be folded in half lengthwise before attachment to the reel. In this embodiment, two membrane sheets are sufficient to completely cover the ice surface, each membrane sheet being about 43 feet in width to provide a folded width of about 21.5 feet, and about 200 feet long to extend the full length of the ice surface. These dimensions provide a few inches of overlap of the two membrane sheets along the center juncture line.

The procedure involved in applying the thermal barrier to an ice surface is as follows. Reel 10 having wound thereupon a membranous thermal barrier 29 is rolled from a storage location to a position on the ice surface midway between the rink ends. The reel is oriented with its axis perpendicular to the long dimension of the rink surface and may be secured in position by locking one or more of the reel wheels by application of brake means associated therewith. Motor 22 is then engaged to rotate the reel in an unwinding direction which frees two membrane ends 38 and 39 and unrolls a double layer of membrane from the reel.

Two workmen, one at each end 38 and 39 of the membrane may then simultaneously pull the membrane ends to the respective rink ends as unwinding proceeds. A limit switch or similar device may be utilized to disengage motor 22 when the reel is completely unwound at which point the membrane and reel are in the general configuration shown in FIG. 4. The membrane is then disengaged from spool member 11 of reel 10 and the reel is wheeled away. Membrane 29 is then unfolded to cover a surface double its wound width. A second reel and associated membrane is then emplaced in a similar manner to cover the remaining ice surface. Removal of the membranous thermal barrier is accomplished by reversal of the described application procedure.

The membranous thermal barrier must display certain physical characteristics in order to be useful in this invention. It must remain flexible and non-brittle at ice temperatures, i.e., on the order of 10° to 25° F.; it must display a low to negligible degree of water absorption; it must have a low to negligible permeability to water vapor and it desirably displays a low rate of thermal conductivity. In addition, it must have sufficient physical strength to withstand the stresses imposed by its placement and removal upon the ice surface. As can be appreciated, the traditional fabric tarpaulin used in covering athletic fields does not meet these criteria.

Of these characteristics, the low to negligible permeability to water vapor is probably most important. A consideration of the heat transfer mechanisms active adjacent an ice surface demonstrates the importance of this factor. The ice surface, being maintained at a temperature well below the water freezing point, acts as a giant dehumidifier stripping water vapor from the air which comes in contact with it. That water vapor passes through two phase transformations; condensation from a vapor to a liquid state followed by solidification to ice. These two phase transformations extract about 1200 Btu from the ice for every pound of water vapor removed from the air. This heat transfer, in other terms, represents the melting of about 8 pounds of ice for every pound of water vapor stripped from the air.

Materials useful as thermal barriers in this invention comprise generally the foamed polymers in sheet form, particularly closed cell foamed polymeric plastics. Foamed, closed cell polyolefin sheets having a density ranging from about 1 to about 10 lbs. per cubic foot and a thickness ranging from about 1/32 to about 3/16 inch are well suited for use as a thermal barrier in this invention and such materials constitute one preferred composition.

The following table sets out properties of one typical closed cell polyolefin foam sheet suitable for use in this invention.

TABLE

| Property | Typical Value |
| --- | --- |
| Density, lb/ft$^3$ | 3 |
| Tear Strength Elmendorf, g/mil | 4.4 |
| Tensile Strength, Variation between machine direction and transverse direction, lb/in$^2$ | 104–120 |
| Thermal Conductivity at 69.7° C.; Btu/(hr)(ft)$^2$(°F./in) | 0.21 |
| Low Temperature Brittleness at −40° F. | No Failures |
| Moisture Vapor Transmission Rate, g/100 in$^2$/24 hr. | 0.20 |

Figure 7:
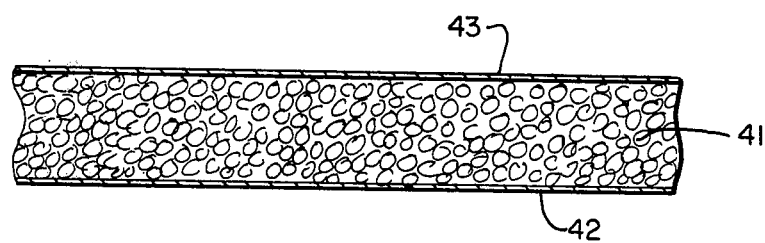
FIG. 7 depicts in cross-section a preferred membranous ice cover.

While a foam sheet 41, shown in FIG. 7, having the properties described above may be used in that form as the thermal barrier, it is often advantageous to enhance its tensile strength by bonding a fabric scrim 42 to one surface. Suitable scrim materials include nylon and the like. It is also advantageous in some applications to provide a thermal barrier of laminated construction, one of the laminate layers being aluminum film 43 and at least one other layer being a plastic or foamed plastic or similar material 41. Use of an aluminum film as a component of the thermal barrier substantially reduces radiation heat transfer to the ice surface and is essentially impervious to vapor transmission.

The foregoing description and examples of the invention are intended to be explanatory thereof and various changes may be made, within the scope of the following claims, without departing from the spirit of the invention.

I claim:

1. A thermal cover for the exposed ice surface of a rink or the like comprising:
   a generally rectangular sheet of flexible material having a length substantially equal to the length of said ice surface;
   attachment means disposed on a surface of said sheet along a portion of a line perpendicular to the long dimension of said sheet at substantially the midpoint thereof, and
   orifice means disposed along the remaining portion of said line, said orifice means spaced so as to correspond to the spacing of said attachment means whereby said attachment means project through said orifice means when said sheet is folded lengthwise.

2. The cover of claim 1 wherein said sheet has a low permeability to water vapor and displays thermal insulation properties.

3. The cover of claim 2 wherein the width of said ice surface is substantially an even multiple of the width of said sheet.

4. The cover of claim 2 wherein said sheet comprises a closed cell foamed plastic material.

5. The cover of claim 4 wherein said foamed plastic material has a density ranging from about 1 to about 10 lbs/ft$^3$ and a thickness ranging from about 1/32 in. to about 3/16 in.

6. The cover of claim 2 wherein said sheet is a laminate, one of said laminate layers being an aluminum foil.

7. The cover of claim 2 including a reinforcing fabric scrim.

8. The cover of claim 2 wherein said attachment means are disposed along one-half of said line, from an end to the center thereof.

9. The cover of claim 2 wherein said attachment means are disposed along the central third of said line.

10. The cover of claim 2 including spaced and paired attachment means disposed along the edges of said sheet.

11. Thermal barrier means to reduce heat transfer to and from an exposed ice surface comprising in combination:
    reel means positionable on said ice surface;
    membranous sheet of generally rectangular flexible material having a low permeability to water vapor and having first attachment means disposed on a surface thereof along at least a portion of a line perpendicular to the long dimension of said sheet at substantially the mid-point thereof;
    second attachment means disposed on said reel, said second attachment means adapted to removably connect to said first attachment means, and
    means to rotate said reel to unwind and to take up a double layer of said sheet upon the reel.

12. The combination of claim 11 wherein said sheet has a length substantially equal to the length of said ice surface.

13. The combination of claim 12 wherein said sheet comprises a closed cell foamed plastic material.

14. The combination of claim 13 wherein said foamed plastic material has a density ranging from about 1 to about 10 lbs/ft$^3$ and a thickness ranging from about 1/32 in. to about 3/16 in.

15. The combination of claim 12 wherein said sheet is a laminate, one of said laminate layers being an aluminum foil.

16. The combination of claim 12 wherein said sheet includes a reinforcing fabric scrim.

17. The combination of claim 12 wherein said first attachment means are disposed along one-half of said line, from an end to the center thereof, and wherein orifice means spaced so as to correspond to the spacing of said first attachment means and adapted to allow projection of said first attachment means through said orifice means are disposed along the other one-half of said line.

18. The combination of claim 17 wherein said sheet in folded in half lengthwise before connection of said first and second attachment means.

19. The combination of claim 12 wherein said first attachment means are disposed along the center one-third of said line and wherein orifice means spaced so as to correspond to the spacing of said first attachment means and adapted to allow projection of said first attachment means through said orifice means are disposed along the remaining two-thirds of the line.

20. The combination of claim 19 wherein said sheet is folded in thirds lengthwise before connection of said first and second attachment means.

21. A method for applying and removing an insulating cover for the exposed ice surface of a rink or the like comprising:
(a) providing a reel having wound thereupon a membranous thermal barrier, a surface of said thermal barrier attached to said reel along a line remote from the barrier ends;
(b) positioning said reel centrally on said ice surface and rotating said reel to unwind a double layer of said barrier material;
(c) pulling the two free ends of the unwinding barrier to the respective rink ends thereby covering the ice surface;
(d) detaching the barrier surface from said reel and removing said reel from the ice surface; and
(e) reversing said steps (b), (c) and (d) to remove said cover from the ice surface.

22. The method of claim 21 wherein said thermal barrier comprises a generally rectangular sheet of insulating material having a low permeability to water vapor.

23. The method of claim 22 wherein said sheet has a length substantially equal to the length of the ice surface and wherein said sheet is folded in half lengthwise before attachment to said reel whereby two sheet layers, each layer comprising two sheet thicknesses, are simultaneously wound and unwound upon said reel.

24. The method of claim 22 wherein said sheet has a length substantially equal to the length of the ice surface and wherein said sheet is folded in thirds lengthwise before attachment to said reel whereby two sheet layers, each layer comprising three sheet thicknesses, are simultaneously wound and unwound upon said reel.

25. The method of claim 22 wherein said sheet comprises a closed cell foamed plastic material.

26. The method of claim 25 wherein said foamed plastic material has a density ranging from about 1 to about 10 lbs/ft$^3$ and a thickness ranging from about 1/32 in. to about 3/16 in.

27. The method of claim 22 wherein said sheet is a laminage, one of said laminate layers being an aluminum foil.

28. The method of claim 22 wherein said sheet includes a reinforcing fabric scrim.

* * * * *